US007747290B1

(12) United States Patent
Lundy et al.

(10) Patent No.: US 7,747,290 B1
(45) Date of Patent: Jun. 29, 2010

(54) METHOD AND SYSTEM FOR DEMARCATING A PORTION OF A MEDIA FILE AS A RINGTONE

(75) Inventors: Michael T. Lundy, Olathe, KS (US); Harry H. Lai, Overland Park, KS (US); Jason Whitney, Lees Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 586 days.

(21) Appl. No.: 11/656,803

(22) Filed: Jan. 22, 2007

(51) Int. Cl.
*H04M 1/00* (2006.01)

(52) U.S. Cl. ............... 455/567; 455/557; 455/414.1

(58) Field of Classification Search ........... 455/567, 455/556.1, 556.2, 557, 412.2, 414.1
See application file for complete search history.

(56) References Cited

U.S. PATENT DOCUMENTS

| | | | |
|---|---|---|---|
| 5,870,683 | A | 2/1999 | Wells et al. |
| 6,414,725 | B1 | 7/2002 | Clarin et al. |
| 6,473,099 | B1 | 10/2002 | Goldman et al. |
| 6,571,255 | B1 | 5/2003 | Gonsalves et al. |
| 6,714,826 | B1 | 3/2004 | Curley et al. |
| 6,943,681 | B2 | 9/2005 | Rezvani et al. |
| 6,993,246 | B1 | 1/2006 | Pan et al. |
| 6,993,349 | B2 | 1/2006 | Martinez et al. |
| 7,031,437 | B1 | 4/2006 | Parsons et al. |
| 7,103,391 | B2 * | 9/2006 | Chan .................. 455/567 |
| 7,136,482 | B2 * | 11/2006 | Wille ................ 379/373.02 |
| 7,142,645 | B2 * | 11/2006 | Lowe .................. 379/88.16 |
| 7,162,220 | B2 | 1/2007 | Hanson |
| 7,221,855 | B2 | 5/2007 | Kim et al. |
| 7,391,300 | B2 | 6/2008 | Inkinen |
| 7,409,569 | B2 | 8/2008 | Illowsky et al. |
| 7,424,446 | B2 * | 9/2008 | Emodi et al. .............. 705/26 |
| 2003/0109251 | A1 | 6/2003 | Fujito et al. |
| 2004/0032946 | A1 | 2/2004 | Koser et al. |
| 2004/0234250 | A1 | 11/2004 | Cote et al. |

(Continued)

FOREIGN PATENT DOCUMENTS

WO    WO 2006/002645 A1    1/2006

OTHER PUBLICATIONS

Phillip Torrone, pt's "How-to" Tuesday, How to make your own Ringtones . . . , printed from the World Wide Web from http://www.engadget.com/2004/05/25/pts-how-to-tuesday-how-to-make-your-own-ringtones/, May 25, 2004.

(Continued)

*Primary Examiner*—Temica M Beamer

(57) ABSTRACT

A method and apparatus for storing a media file in a device (e.g., a cellular phone, PDA, or alarm clock) and demarcating a portion of the stored media file as a ringtone, without storing the demarcated portion as a separate media file in the device. Thereafter, in response to detection of an alert at the device, the demarcated portion of the media file may be played out as an alert. The stored media file may be an audio file such that the ringtone is an audio ringtone, a video file such that the ringtone is a video ringtone, or an audio-video file such that the ringtone is an audio-video ringtone. Demarcating the portion of media file may include defining a ringtone start point and a ringtone end point. The ringtone start point and end point may be associated with distinct time stamps or data pointers.

23 Claims, 7 Drawing Sheets

U.S. PATENT DOCUMENTS

| | | | |
|---|---|---|---|
| 2005/0129196 | A1 | 6/2005 | Creamer et al. |
| 2005/0136988 | A1 | 6/2005 | Vilamil et al. |
| 2005/0170865 | A1 | 8/2005 | Harvej et al. |
| 2005/0185918 | A1 | 8/2005 | Lowe |
| 2005/0197167 | A1* | 9/2005 | Aoike .................... 455/567 |
| 2005/0227674 | A1 | 10/2005 | Kopra et al. |
| 2005/0286497 | A1 | 12/2005 | Zutaut et al. |
| 2006/0015649 | A1 | 1/2006 | Zutaut et al. |
| 2006/0028951 | A1 | 2/2006 | Tozun et al. |
| 2006/0060069 | A1 | 3/2006 | Sinisalo |
| 2006/0077055 | A1 | 4/2006 | Basir |
| 2006/0085188 | A1 | 4/2006 | Goodwin et al. |
| 2006/0095472 | A1 | 5/2006 | Krikorian et al. |
| 2006/0117040 | A1 | 6/2006 | Begeja et al. |
| 2006/0259434 | A1 | 11/2006 | Vilcauskas et al. |
| 2007/0112977 | A1* | 5/2007 | Hornal et al. ............ 709/246 |
| 2007/0201685 | A1* | 8/2007 | Sindoni ................ 379/373.02 |
| 2007/0204042 | A1* | 8/2007 | Noble .................... 709/225 |
| 2007/0226432 | A1 | 9/2007 | Rix |
| 2007/0233905 | A1* | 10/2007 | Hatano et al. .............. 710/16 |
| 2008/0167993 | A1* | 7/2008 | Cue et al. .................. 705/51 |

OTHER PUBLICATIONS

U.S. Appl. No. 12/141,234, filed Jun. 18, 2008 and entitled "Method and system for demarcating a segment of a media file as a ringtone."

Wang, Ye et al., LyricAlly; Automatic Synchronization of Acoustic Musical Signals and Textual Lyrics, Department of Computer Science, School of Computing, National University of Singapore, Singapore, Oct. 2004.

H. Schulzrinne et al., RTP: A Transport Protocol for Real-Time Applications, Network Working Group—Request for Comments: 3550, Jul. 2003.

"Theme Master—A Pocket PC Utility Used to Switch Your Today Screen Theme," Theme Master, http://www.theraggios.com/rpa/ThemeMaster.htm, printed from the World Wide Web on Dec. 7, 2005.

"Cell Phone Wallpaper," Free Cell Phone Wallpaper, http://www.flash-screen.com/free-wallpaper/cell-phone-wallpaper.html, printed from the World Wide Web on Dec. 6, 2005.

LightWav 5 for Treo600/650 5.72, http://www/palmgear.com/index.cfm?fuseaction_software.showsoftware&PartnerREF=&siteid=1&prodid=92488&siteid=1, printed from the world wide web on Sep. 27, 2005.

LightWav 5.7.2, http://mytreo.net/downloads/details-108.html-?LightWav, printed from the world wide web on Sep. 27, 2005.

Verizon Wireless, VZW Tones, Feb. 22, 2005.

Caller Ringtones, http://crt.maxis.com.my/prbt/user_console/RbtAdmin/english/BrowsingPage.jsp, printed from the world wide web on Sep. 27, 2005.

U.S. Appl. No. 11/217,654, filed Sep. 1, 2005, entitled "Automatic delivery of alerts including static and dynamic portions."

U.S. Appl. No. 11/237,058, filed Sep. 28, 2005, entitled "Automatic rotation through play out of audio-clips in response to detected alert events."

Jason Fields, MP3 Speaking Ringtones for 802se, Mar. 8, 2005, downloaded from the world wide web at http://www.air-port.com/blog2/03/08/2005/mp3-speaking-ringtones-for-802se/.

Hayden Porter, Phone it in!, Feb. 1, 2004, downloaded from the world wide web at http://emusician.com/mag/desktop/emusic_phone/.

Pictones, downloaded from the world wide web on Sep. 1, 2005 at http://musiwave.net/pictones-multimedia-ringtones.html.

Musitones, downloaded from the world wide web on Sep. 1, 2005 at http://www.musiwave.net/musitones-real-music-ringtones.html.

Logo & Images, downloaded from the world wide web on Sep. 1, 2005 at http://www.musiwave.net/mobile-phone-services-provider.html.

U.S. Appl. No. 11/561,429, filed Nov. 20, 2006, entitled "Method and apparatus for establishing a media clip."

U.S. Appl. No. 11/623,561, filed Nov. 23, 2009, entitled "Automatic rotation through play out of audio-clips in response to detected alert events."

U.S. Appl. No. 11/046,083, filed Jan. 28, 2005, entitled "Method and system for calendar-based delivery of themed user-interface skins."

U.S. Appl. No. 12/141,234, filed Jun. 18, 2008, entitled "Method and System for Demarcating a Segment of a Media File as a Ringtone."

* cited by examiner

METHOD AND SYSTEM FOR DEMARCATING A PORTION OF A MEDIA FILE AS A RINGTONE

FIELD OF INVENTION

The present invention relates to media files, and more particularly to media files stored at a device.

DESCRIPTION OF RELATED ART

The number of people using cellular phones to place an outgoing call and/or to receive an incoming call has been steadily increasing over the last several years. Many cellular phones provide an alert in response to receiving an incoming call. For example, a cellular phone may play a ringtone when an incoming call arrives at the cellular phone.

Early-model cellular phones included one or more audio ringtone files for playing out an alert in response to incoming calls arriving at the cellular phones. Playing out one of the audio ringtone files in an early-model cellular phone typically resulted in the cellular phone producing an audible sound similar to a ring sound produced by a legacy landline telephone. Users of early-model cellular phones were typically restricted to using audio ringtone files programmed into the phones at the time the phones were manufactured.

Late-model cellular phones have provided users with increasingly advanced options for playing out ringtones in response to an incoming call. These late-model cellular phones, for instance, allow a user to download one or more ringtone files from a network server. A downloadable ringtone file may consist of a portion of a song (e.g. a user's favorite portion of the song). In this way, a cellular phone may play out the user's favorite portion of the song as a ringtone in response to an incoming call arriving at the cellular phone.

In addition to downloading a ringtone file consisting of only a portion of the song, late-model cellular phones may allow a user to download a media file including an entire song. Such a cellular phone may include a media player and speaker to playout the entire song. In this way, a user of the cellular phone may listen to entire song for the user's entertainment.

Furthermore, in some cases, a user might download both the entire song (e.g., for playout by the media player of the cellular phone) and a portion of the song (e.g., encoded or set as a ringtone for playout in response to an incoming call). Saving both the entire song (e.g., the media file) and the portion of the song (e.g., the ringtone file) is redundant and wasteful since cellular phones have limited data storage capacity. An improvement is thus desired.

SUMMARY

The present invention provides a method and system for storing a media file, demarcating a portion of the media file as a ringtone without storing the demarcated portion as a separate media file, and playing out from the media file the demarcated portion of the media file as an alert.

In one respect, an exemplary embodiment of the present invention may take the form of a method. This method may include (i) storing a media file in a device, (ii) demarcating as a ringtone a portion of the media file, without storing the demarcated portion as a separate media file in the device, and (iii) playing out from the media file the demarcated portion of the media file as an alert, responsive to detection of an alert event at the device.

In another respect, the exemplary embodiment may take the form of a device comprising (i) a user interface, (ii) a processor, and (iii) data storage to store a media file and program instructions executable by the processor. The program instructions may include instructions that cause the processor to demarcate as a ringtone a portion of the media file without storing the demarcated portion as a separate media file, and to play out from the media file at the user interface the demarcated portion of the media file as an alert, responsive to detection of an alert event at the device.

In yet another respect, the exemplary embodiment may take the form of a method that includes a network entity demarcating a portion of a media file as a ringtone by producing a start point indicator indicative of a ringtone start point and producing an end point indicator indicative of a ringtone end point. This method may include a wireless communication device (i) receiving from the network entity the media file, the start point indicator, and the end point indicator; (ii) storing the start point indicator, the end point indicator, and the media file without storing the demarcated portion of the media file as a separate media file, and (iii) playing out from the media file the demarcated portion of the media file as an alert, responsive to a communication arriving at the wireless communication device.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Overview

The present invention is directed to a method and apparatus for storing a media file, demarcating a portion of the stored media file as a ringtone without storing the demarcated portion as a separate media file, and playing out from the media file the demarcated portion of the media file as an alert. The storing, demarcating, and playing functions may be carried out at a device. In this way, the demarcated portion of the media file may be played out in response to detection of an alert event at the device. As an example, the alert event may be expiration of a timer, occurrence of a given time set as an alarm time, a meeting reminder, a communication (e.g., an incoming call message) arriving at the device, or any other event for which an alert may be played out.

Figure 1:
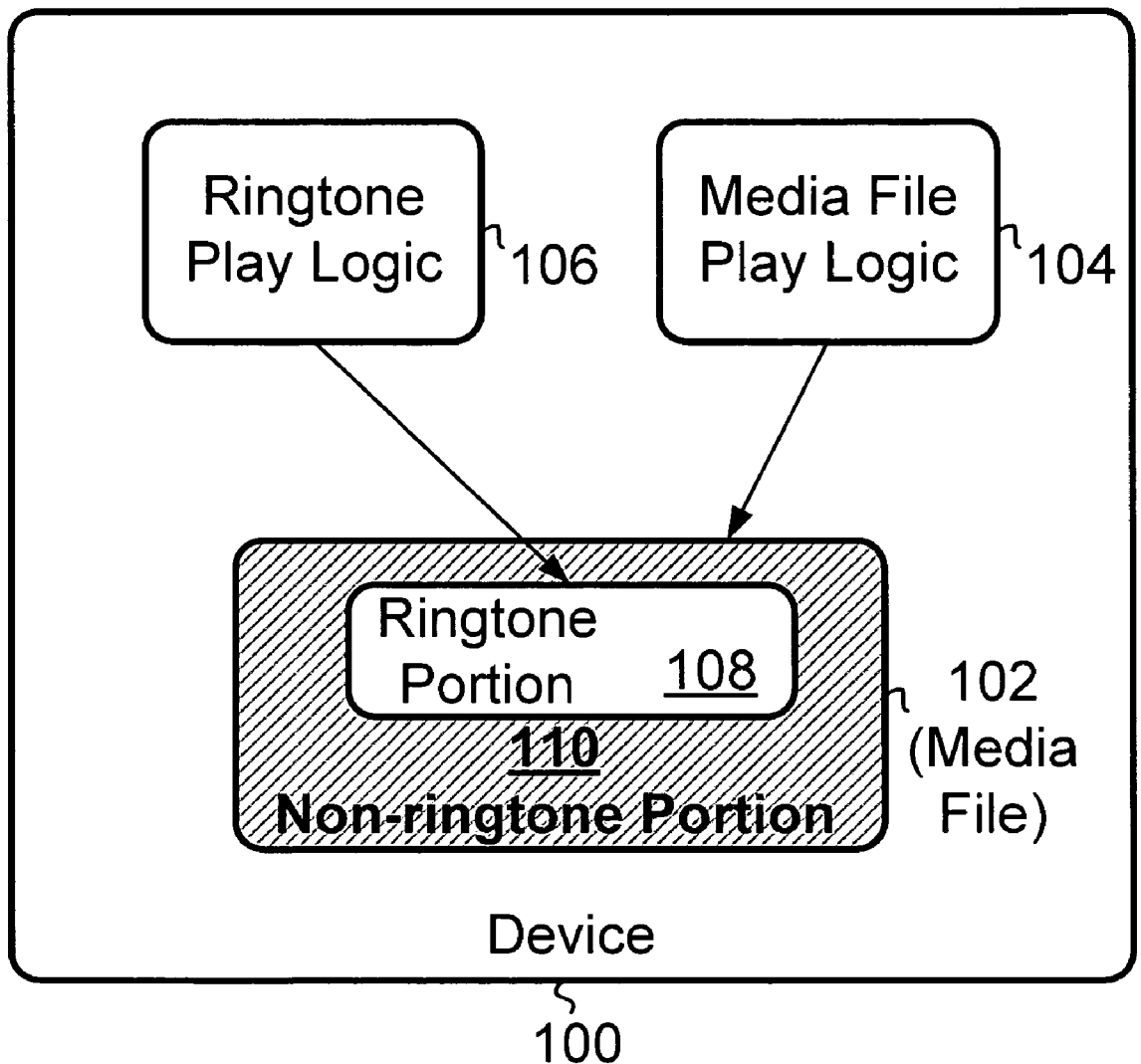
FIG. 1 is a simplified block diagram of an exemplary device for carrying out the present invention.

FIG. 1 is a block diagram of an exemplary device 100 for carrying out the present invention. Device 100 may include a media file 102, media file play logic 104, and ringtone play logic 106. A portion of media file 102 is demarcated as a ringtone portion 108 and the remaining portion of media file 102 may be considered a non-ringtone portion 110. Ringtone portion 108 is some portion of media file 102 less than the entire media file 102.

Device 100 may be any of a variety of devices. In the exemplary embodiment, device 100 is a wireless communication device such as a cellular phone, or a device such as a computer (e.g., a laptop computer) or personal digital assistant (PDA) having a wireless network interface. Alternatively, or in combination, device 100 may be a wireline communication device such as a telephone or laptop computer that connects to a network, or a device without a network interface such as an alarm clock or a PDA. A wireline communication device may include a wireline network interface card (NIC) and may connect to a network via one or more conductors such as a twisted-pair of copper wires, a CAT5 or CAT5e cable, a coaxial cable, or a fiber optic cable. Other examples of device 100 are also possible.

Media file 102 may be any of a variety of media files. In one respect, media file 102 may be an audio file. As an example, an audio file may be (i) an MPEG-1 Audio Layer 3 (MP3) file having a file extension of '.mp3,' (ii) a WAVE media file having a file extension of '.wav,' or (iii) a Real Audio media file having a file extension of '.rm' or '.ram.' In another respect, media file 102 may be a video file or an audio-video file. As an example, a video file or an audio-video file may be (i) a Motion Pictures Expert Group (MPEG) file having a file extension of '.mpg' or '.mpeg,' (ii) an Audio Video Interleave (AVI) file having a file extension of '.avi,' or (iii) a Windows Media file having a file extension of '.wmv.' Other examples of an audio file, video file, audio-video file, or another type of media file are also possible.

Figure 2:
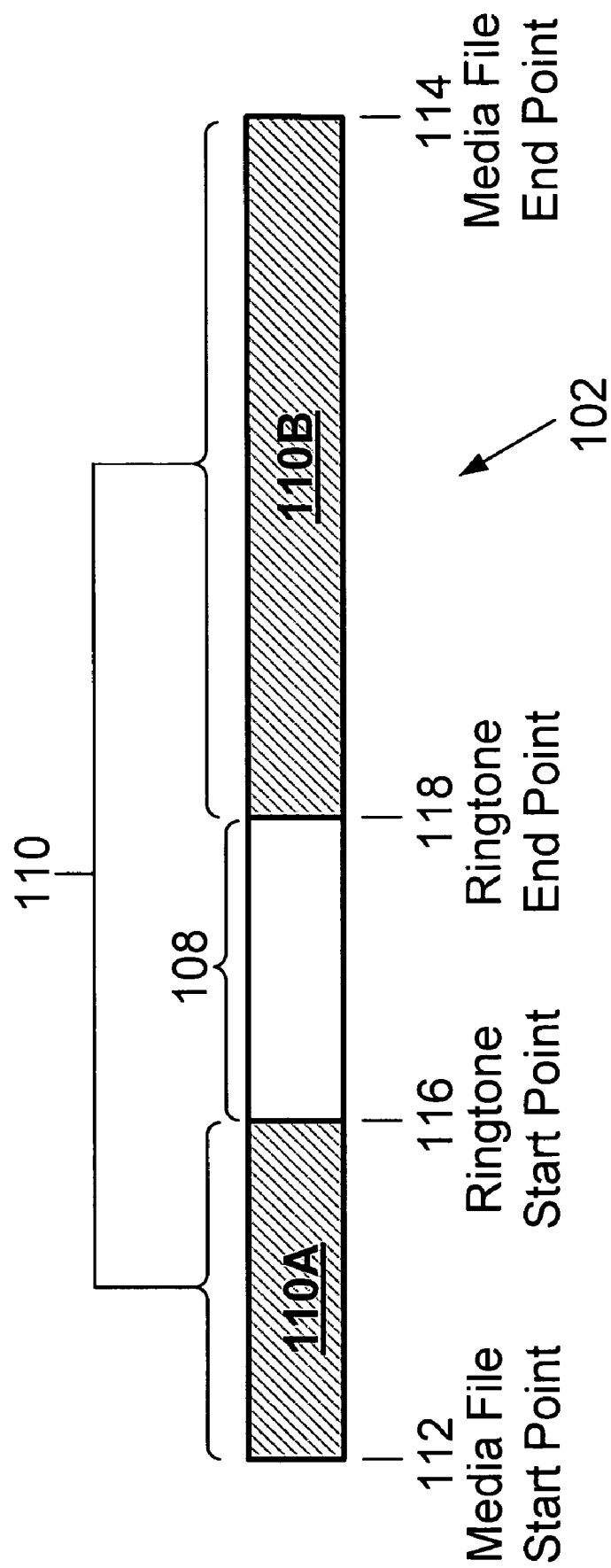
FIG. 2 is a diagram representing a media file and a portion of the media file demarcated as a ringtone in accordance with the present invention.

FIG. 2 is a diagram illustrating media file 102, ringtone portion 108, non-ringtone portion 110, a media file start point 112 and a media file end point 114 that each define a distinct boundary of media file 102, and a ringtone start point 116 and a ringtone end point 118 that each define a distinct boundary of ringtone portion 108. As shown in FIG. 2, non-ringtone portion 110 includes a first sub-portion 110A prior to ringtone portion 108 and a second sub-portion 110B after ringtone portion 108. Alternatively, media file start point 112 may coincide with ringtone start point 116 such that non-ringtone portion 110 does not include sub-portion 110A. Further, and alternatively, media file end point 114 may coincide with ringtone end point 118 such that non-ringtone portion 110 does not include sub-portion 110B.

Referring back to FIG. 1, device 100 may execute media file play logic 104. Execution of media file play logic 104 may cause device 100 to play out the entire media file 102 including both ringtone portion 108 and non-ringtone portion 110. In this regard, media play logic 104 may cause media file 102 to be played out from media file start point 112 to media file end point 114. Media file play logic 104 may be executed in response to a user selecting media file 102 to be played out in a non-alert mode.

Similarly, device 100 may execute ringtone play logic 106. Execution of ringtone play logic 106 may cause device 100 to play out ringtone portion 108. In this regard, ringtone play logic 106 may cause ringtone portion 108 to be played out from ringtone start point 116 to ringtone end point 118. Ringtone play logic 106 may be executed in an alert mode triggered by device 100 detecting occurrence of an alert event. Playout of ringtone portion 108 may occur during the alert-mode so as to alert a user that the alert event has occurred and/or while the alert event is occurring.

2. Exemplary Architecture

Figure 3:
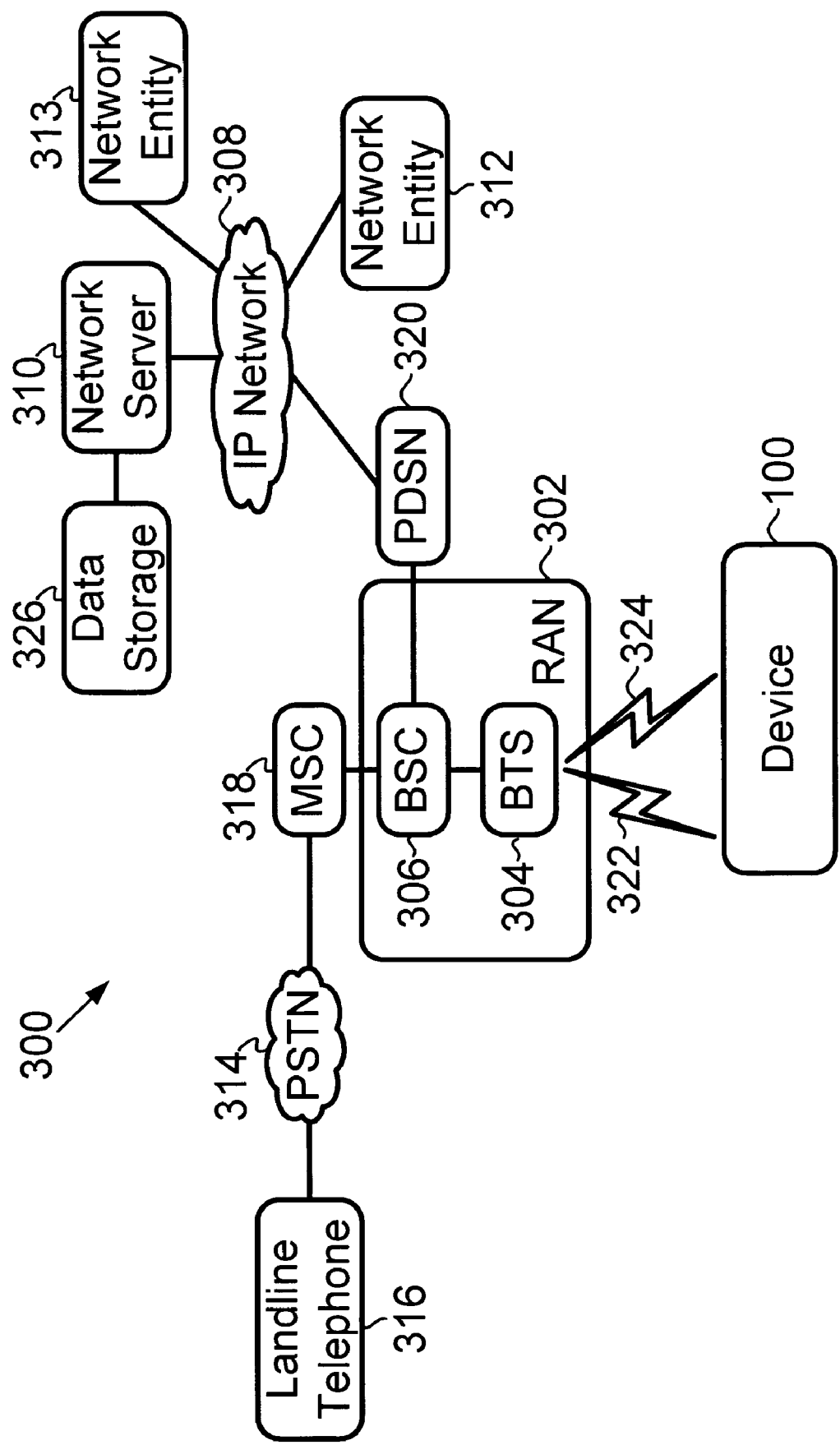
FIG. 3 is a simplified block diagram of a network arrangement in which an exemplary embodiment of the present invention can be implemented.

FIG. 3 is a block diagram of a network 300 in which the exemplary embodiment can be implemented. It should be understood, however, that this and other arrangements described herein are provided for purposes of example only: As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software.

Network 300 may include (i) a radio access network (RAN) 302 including a base transceiver station (BTS) 304 and a base station controller (BSC) 306, (ii) an Internet Protocol (IP) network 308 providing connectivity with a network server 310 and network entities 312 and 313, (iii) a public switched telephone network (PSTN) 314 providing connectivity with one or more landline telephones such as landline telephone 316, (iv) a mobile switching center (MSC) 318, and (v) a packet data serving node (PDSN) 320 that connects BSC 306 and IP network 308.

BTS 304 radiates RF signals 322 away from the BTS 304 to form a cell or a cell sector. Device 100 may be located within the cell or cell sector formed by RF signals 322. For purposes of describing FIG. 3, device 100 is considered to be a wireless communication device. Device 100 may communicate with BTS 304 via RF signals 322, and via RF signals 324 that are radiated away from device 100. The radiated RF signals 322, 324 are arranged according to an air interface protocol, such as a Code Division Multiple Access (CDMA) protocol. Other examples of air interface protocols are also possible.

BSC 306 may perform a variety of functions. For example, BSC 306 may (i) allocate radio resources to device 100 and to one or more other wireless communication devices, and (ii) manage handoff of calls from BTS 304 to another BTS or from another BTS to BTS 304. Furthermore, BSC 306 may include a packet control function (PCF) for controlling transmission of data packets between BTS 304 and PDSN 320. These data packets may have a destination of device 100 and a payload including media file 102. BSC 306 may be integrated in whole or in part with BTS 304.

MSC 308 may be a switch that provides RAN 302 with connection interface to a wireline circuit-switched network (e.g., PSTN 314). In this way, MSC 308 provides means for device 100 to communicate with landline telephone 316 or any of the other one or more landline telephones connected to PSTN 314. Device 100 may (i) receive from landline telephone 316 and the other one or more landline telephones communications that device 100 detects as alert events, and (ii) responsively play out ringtone portion 108 of media file 102.

Network server 310 may be integrated in whole or in part with data storage 326. Network server 310 may perform services for one or more client devices, such as device 100. For example, network server 310 may receive from device 100 a message requesting that media file 102 be sent to device 100, and network server 310 may respond by retrieving media file 102 from data storage 326 and then transmitting media file 102 to IP network 308 for transmission, in turn, to device 100.

As another example, network server 310 may demarcate a portion of media file 102 as ringtone portion 108. In this regard, network server 310, may receive user selections indicative of a start point indicator (i.e., a point of media file 102 where playout of ringtone portion 108 is to begin) and an end point indicator (i.e., a point of media file 102 where playout of ringtone portion 108 is to end). In this way, ringtone portion 108 may consist of the portion of media file 102 between the start point indicator and the end point indicator.

Network server 310 may receive the user selections from a variety of sources, such as device 100 or a user interface connected to network server 310. Alternatively, network server 310 may receive the user selections from a network entity 312, 313, which may be a computer, telephone or some other device that interfaces to IP network 308. After receiving the start point indicator and the end point indicator, network server 310 may store in data storage 326 the start point indicator and the end point indicator as meta data within media file 102. Alternatively, after receiving the start point indicator and the end point indicator, network server 310 may store in data storage 326 the start point indicator and the end point indicator as a data file separate from media file 102.

Network server 310 may transmit to device 100 the media file 102 with the meta data, and device 100 may store media file 102 with the meta data so as to store a demarcated portion of media file 102 without storing the demarcated portion as a separate media file. Alternatively, network server 310 may transmit to device 100 media file 102 and the separate data file including the start point indicator and the end point indicator. Device 100 may then obtain from the separate data file the start point indicator and the end point indicator and thereafter store these indicators as meta data within media file 102 to indicate ringtone start point 116 and ringtone end point 118, respectively. Other examples of services performed by network server 310 are also possible.

Figure 4:
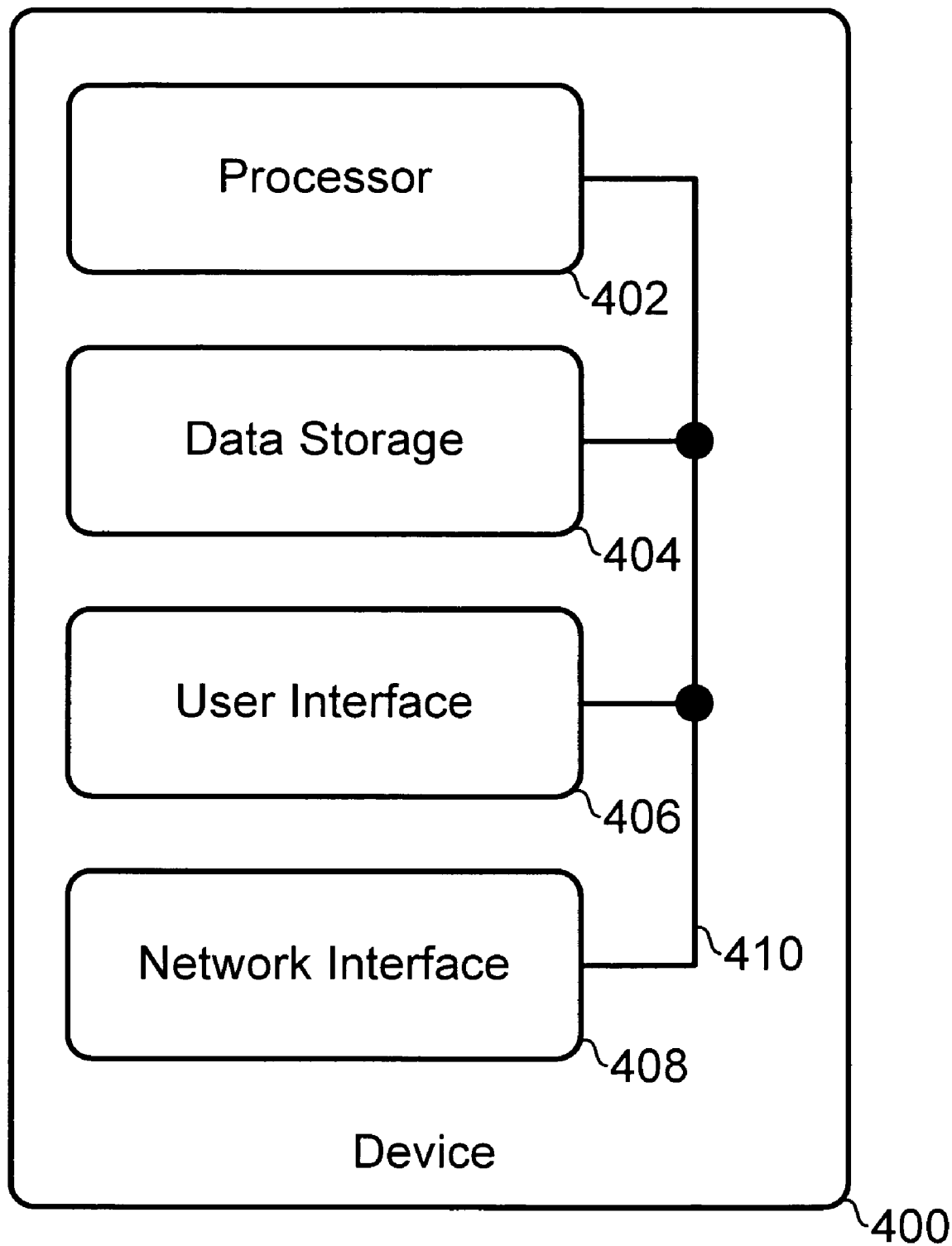
FIG. 4 is a simplified block diagram of another exemplary device for carrying out the present invention.

Next, FIG. 4 is a block diagram of an exemplary device 400 for carrying out the present invention. Device 400 may be a communication device for performing communications with another person and/or another communication device. Device 400 may include a processor 402, data storage 404, a user interface 406, and a network interface 408, all linked together via a system bus, network, or other connection mechanism 410. Device 100 shown in FIG. 1 may be arranged as device 400 of FIG. 4. Alternatively, device 100 may omit one or more of the elements 402, 404, 406, 408, or 410. For instance, network interface 408 may be omitted from device 100 such that device 100 includes processor 402, data storage 404, and user interface 406; all linked together via connection mechanism 410.

Processor 402 may comprise one or more general purpose processors (e.g., INTEL microprocessors) and/or one or more special purpose processors (e.g., digital signal processors). Processor 402 may execute computer-readable program instructions, such as the program instructions that are described below.

Data storage 404 comprises a computer readable medium. A computer readable medium may comprise volatile and/or non-volatile storage components, such as optical, magnetic, organic or other memory or disc storage, which can be integrated in whole or in part with a processor, such as processor 402. Alternatively, the entire computer readable medium may be remote from processor 402 and coupled to processor 402 by connection mechanism 410.

Data storage 404 may store various types of data. In one respect, data storage 404 may store data arranged as program instructions executable by processor 402. As an example, the program instructions storable in data storage 404 may include program instructions arranged as media file play logic 104 and ringtone play logic 106. As another example, the program instructions may include program instructions that cause processor 402 to demarcate a portion of media file 102 as ringtone portion 108 without storing ringtone portion 108 as a separate media file. As yet another example, the program instructions may include program instructions that cause processor 402 to detect inputs entered at user interface 406 for such purposes as (i) requesting that media file 102 be downloaded to device 400, (ii) selecting media file 102 to be played out in its entirety, and (iii) selecting ringtone start point 116 and ringtone end point 118 (and/or other points associated with media file 102) for demarcating ringtone portion 108 while media file 102 is playing out at device 400.

As yet another example, the program instruction storable in data storage 404 may include program instructions that cause processor 402 to detect occurrence of an alert event at device 400 (or device 100). For instance, the alert event may be expiration of a timer, occurrence of a given time set as an alarm time, a meeting reminder, a communication (e.g., an incoming call message) arriving at device 400, or device 400 powering on (i.e., changing from an off-state to an on-state) or powering off (i.e., changing from the on-state to the off-state).

As still yet another example, the program instructions storable in data storage 404 may include program instructions (e.g., arranged as ringtone play logic 106) that cause processor 402 and/or user interface 406 to play out ringtone portion 108 of media file 102 as an alert. In this regard, the program instructions may be arranged as an application (e.g., a Windows Media® Player application produced by Microsoft Corporation of Redmond, Wash.) to play out media files at user interface 406. The program instructions that cause ringtone portion 108 to be played out may be executed in response to processor 402 detecting occurrence of the alert event. Other examples of program instructions storable in data storage 404 are also possible.

In another respect, data storage 404 may store one or more media files presentable at user interface 406. Each of the one or more media files storable in data storage 404 may be stored with or without a portion of the media file demarcated as a ringtone portion. As an example, data storage 404 may store media file 102 including ringtone portion 108. In this way, data storage 404 may store media file 102 and ringtone portion 108 without storing ringtone portion 108 as a separate media file. A media file stored without a portion of the media file demarcated as a ringtone may be stored for playing out the media file for a user's entertainment in a non-alert mode.

In yet another respect, data storage 404 may store data associated with one or more demarcated ringtone portions of a media file. As an example, data storage 404 may store data associated with ringtone portion 108 of media file 102, such as data indicating the ringtone start point 116 and the ringtone end point 118. This stored data may be used to play out the media file 102 from the ringtone start point 116 to the ringtone end point 118 (i.e., the ringtone portion 108 of media file 102) as an alert. Examples of data associated with ringtone start points and ringtone end points are discussed below with respect to FIGS. 5 and 6.

As still yet another example, data storage 404 may store data that indicates whether a ringtone portion, such as ringtone portion 108 of media file 102, is an active ringtone portion to be played out as a ringtone or is an inactive ringtone portion not to be played out as a ringtone. For example, data storage 404 may store data that indicates ringtone portion 108 is an active ringtone to be played out in response to all communications received at device 400. As another example, data storage 404 may store data that indicates ringtone portion 108 is to be played out as a ringtone when device 400 receives a communication from a given person. As yet another example, data storage 404 may store data that indicates which of a plurality of ringtone portions of a single media file (or of a plurality of media files) are active ringtone portions to be played out as a ringtone or are inactive ringtone portions. Other examples of the data stored in data storage 404 are also possible.

User interface 406 may comprise one or more elements that allow a user to interact with device 400 (or device 100). In one respect, a user may interact with device 400 by providing data to device 400. Thus, user interface 406 may include a keypad having multiple keys that may be pressed to input various data such as data to select a media file, data to select a ringtone start point, data to select a ringtone end point, data to select a given ringtone portion of a media file to be identified as an inactive ringtone portion, or data to select a given ringtone portion of a media file as an active ringtone portion for a particular type of alert event occurring at device 400, such as a communication arriving at device 400 and/or for a communication received from a particular person. User interface 406 may include other means for inputting the various data identified above.

As another example, user interface 406 may include a microphone and electronic circuitry for capturing sound waves from the user and/or another source for storage as an audio file or as part of an audio-video file. As yet another example, user interface 406 may include a digital camera for capturing a series of images for storage as a video file or as part of an audio-video file.

In another respect, a user may interact with device 400 by observing (e.g., seeing and/or hearing) data presented by user interface 406. User interface 406 may present data to a user in any of a variety of ways. For example, user interface 406 may include a display, such as a liquid crystal display (LCD), for presenting video files. In this way, the display may play out the ringtone portion of a video file as a video ringtone. As another example, user interface 406 may include one or more loudspeakers for presenting audio files. In this way, the one or more loudspeakers may play out the ringtone portion of an audio file as an audio ringtone. As yet another example, user interface 406 may include a display and one or more loudspeakers for presenting audio-video files. In this way, the one or more loudspeakers, in combination with the display, may play out the ringtone portion of an audio-video file as an audio-video ringtone.

Network interface 408 may be arranged in any of a variety of configurations. For example, network interface 408 may include a chipset and antenna for performing wireless communication over a cellular air interface of RAN 302 or over another air interface such as an air interface according to an IEEE 802.11x protocol. An example of a chipset that facilitates communication according to the CDMA air interface protocol is the MSM6000™ chipset manufactured by Qualcomm Incorporated of San Diego, Calif. Other examples of a chipset for performing wireless communication over an air interface of RAN 302 or another air interface are also possible.

Alternatively, or in combination, network interface 408 may include a chipset for performing wireline communications directly over a wireline portion of network 300. In this regard, for example, network interface 408 may connect directly to IP network 308. A chipset for performing wireline communications may be mounted on a network interface card (NIC). An example of a NIC with a chipset for performing wireline communications according to the IEEE 802.3® standard for Carrier Sense Multiple Access with Collision Detection (CSMA/CD) Access Method is the SP2610R Gigabit Ethernet Adapter NIC manufactured by the Spectrum Technologies Corporation of Taipei Hsien, Taiwan, Republic of China. Other examples of NICs with a chipset for performing wireline communications and other examples of wireline communication standards are also possible.

Figure 5:
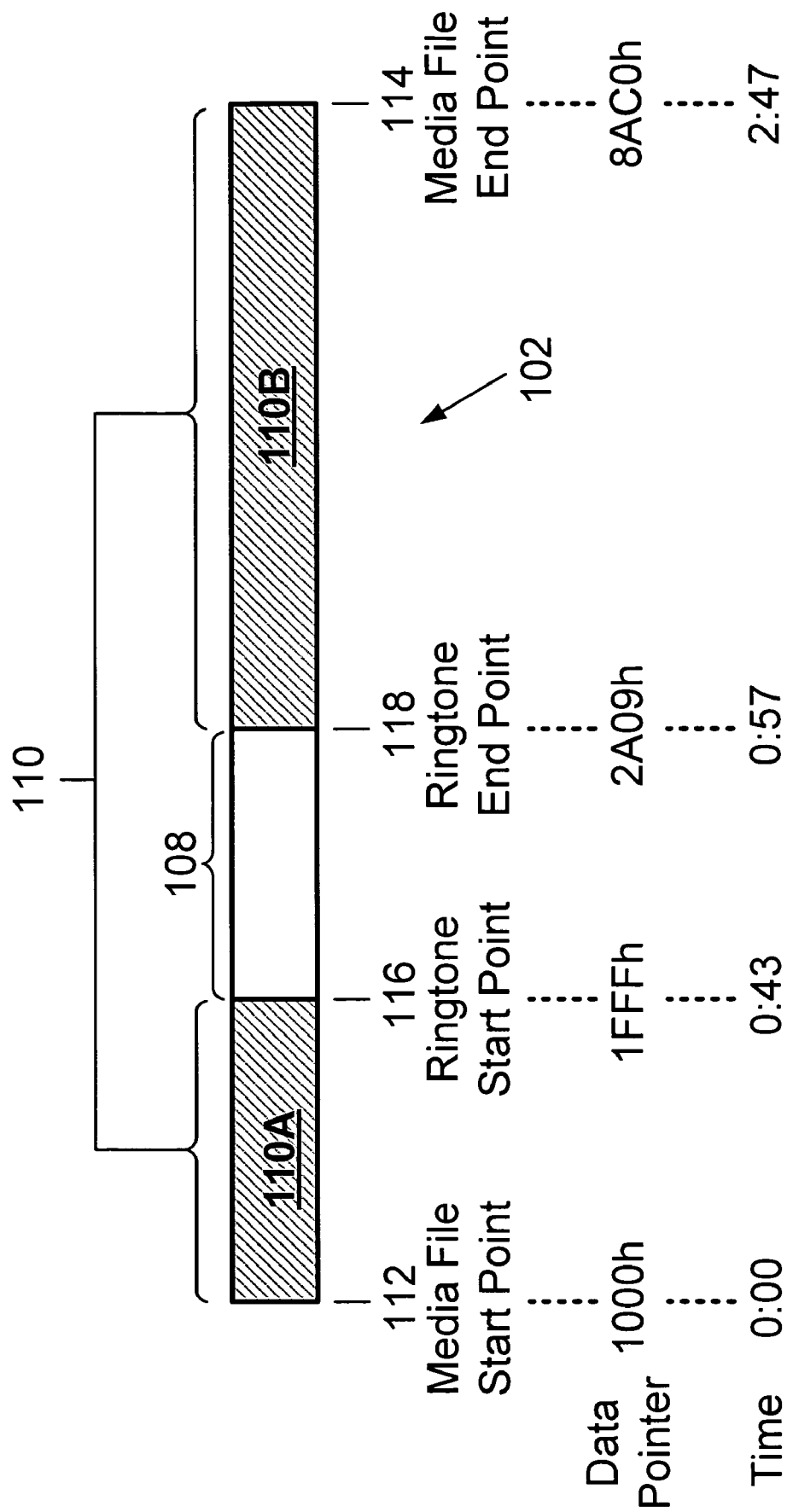
FIGS. 5 and 6 are diagrams representing a media file and a portion of the media file demarcated as a ringtone in accordance with the present invention.

Next, FIG. 5 is a diagram depicting media file 102 with ringtone portion 108. Ringtone portion 108 is a contiguous portion of media file 102. As noted above, media file 102 may be defined, in part, by media file start point 112 and media file end point 114 and ringtone portion 108 may be defined, in part, by ringtone start point 116 and ringtone end point 118. Alternatively, media file 102 may be defined, in part, by media file start point 116 and an elapsed time (e.g., 2 minutes and 47 seconds, i.e., 2:47), and ringtone portion 108 may be defined, in part, by ringtone start point 116 and another elapsed time (e.g., 0:14 seconds, i.e. 14 seconds between 0:43 and 0:57).

A distinct time value may be associated with each of the defined start points and end points of media file 102 and ringtone portion 108. By way of example, as shown in FIG. 5, a time value of 0:00 (e.g., 0 minutes and 00 seconds) is associated with media file start point 112, a time value of 0:43 seconds is associated with ringtone start point 116, a time value of 0:57 seconds is associated with ringtone end point 118, and a time value of 2:47 is associated with media file end point 114. Each of these time values may represent an amount of time required to play out media file 102 at a given play speed (e.g., a 1× play speed) from the beginning of media file 102 until the start or end point associated with each time value.

Playout of ringtone portion 108 at the 1× play speed occurs over a 14 second time span (e.g., from the time value of 0:43 to the time value of 0:57), and playout of the entire media file 102 at the 1× play speed occurs over a 2 minute and 47 second time span (from the time value 0:00 to the time value of 2:47). Other examples of the amount of time to play out media file 102 or ringtone portion 108 are also possible. For instance, a time span for playing out a ringtone may be greater than or less than 14 seconds, and a time span for playing out an entire media file may be greater than or less than 2 minutes and 47 seconds.

Alternatively, or in combination with the time value associated with each of the defined start points and end points, a distinct data pointer (e.g., an address of data storage 404) may be associated with each of the defined start points and end points of media file 102 and ringtone portion 108. By way of example, data pointers in hexadecimal format and within the range of 1000h to 8AC0h may represent addresses of data storage 404 and may be associated with the defined start points and end points of media file 102 and ringtone portion 108. For purposes of this description, the 'h' suffix is used to indicate a hexadecimal value.

Further, and alternatively, media file start point 112 and ringtone start point 116 or media file end point 114 and ringtone end point 118 may each be associated with the same time value and/or data pointer. For example, media file start point 112 and ringtone start point 116 may each be associated with the time value 0:00 and/or data pointer 1000h. As another example, media file end point 114 and ringtone end point 118 may each be associated with the time value 2:47 and/or data pointer 8AC0h.

As shown in FIG. 5, media file start point 112 is associated with data pointer 1000h, ringtone start point 116 is associated with data pointer 1FFFh, ringtone end point 118 is associated with data pointer 2A09h, and media file end point 114 is associated with data pointer 8AC0h. Other examples of the data pointers, including data pointers having a range greater than or less than 31,424 data bytes (i.e., 8AC0h-1000h), are also possible.

Processor 402 may execute program instructions that cause user interface 406 to play out media file 102 in its entirety. By way of example, the program instructions for playing out media file 102 in it entirety may cause processor 402 to retrieve from data storage 404 data stored in addresses 1000h to 8AC0h, convert the retrieved data from a digital form to an analog form, and provide the converted data in analog form to user interface 406. Alternatively, processor 402 may provide user interface 406 with the digital form of the retrieved data. User interface 406 may play out media file 102 as user interface 406 receives a portion of the retrieved data or after user interface 406 has received all of the retrieved data.

Similarly, processor 402 may execute program instructions that cause user interface 406 to play out ringtone portion 108 in response to detection of an alert event at device 400. By way of example, the program instructions for playing out ringtone portion 108 may cause processor 402 to retrieve from data storage 404 data stored in addresses 1FFFh to 2A09h, convert the retrieved data from a digital form to an analog form, and provide the converted data in analog form to user interface 406. Alternatively, processor 402 may provide user interface 406 with the digital form of the retrieved data. User interface 406 may play out ringtone portion 108 as user interface 406 receives a portion of the retrieved data or after user interface 406 has received all of the retrieved data.

As another example, the program instructions for playing out ringtone portion 108 may cause processor 402 to play out media file 102 for a given length of time from the ringtone start point 116. For instance, processor 402 may retrieve from data storage 404 data starting at address 1FFFh and consecutive data addresses following address 1FFFh until media file 102 has been played out for the given length of time. The given length of time to playout a ringtone portion may be fourteen (14) seconds (e.g., 0:43 seconds to 0:57 seconds), or a length of time greater than or less than fourteen (14) seconds. In accordance with this example, the ringtone end point 118 may not have to be defined in order to play out ringtone portion 108.

Playing out the portion of media file 102 demarcated as ringtone portion 108 may include playing out ringtone portion 108 from ringtone start point 116 to ringtone end point 118 one time. Alternatively, playing out the portion of media file 102 demarcated as ringtone portion 108 may include playing out ringtone portion 108 from ringtone start point 116 to ringtone end point 118 more than one time (e.g., two times). In this regard, while playing out ringtone portion 108 more than one time, each time ringtone end point 118 is reached, play out of ringtone portion 108 continues at ringtone start point 116.

Further, repeating playout of ringtone portion 108 may continue as long as device 400 continues to detect the alert event that triggered playout of ringtone portion 108 is still occurring. Alternatively, repeating playout of ringtone portion 108 may continue until device 400 (e.g., by execution of program instructions at processor 402) detects the alert event is not occurring, or repeating playout of ringtone portion 108 may continue until a predetermined alert time length has occurred. For instance, a predetermined alert time length of thirty (30) seconds may occur whenever a given alert event is detected. In this way, ringtone portion 108 will be played twice in its entirety followed by the first two second of ringtone portion 108. Other examples of repeating playout of ringtone portion 108 are also possible.

As shown in FIG. 5, a contiguous portion of a media file may be demarcated as a ringtone without storing the contiguous portion of the media file as separate media file. Alternatively, a non-contiguous portion of a media file may be demarcated as ringtone without storing the non-contiguous portion of the media file as a separate media file. The non-contiguous portion of the media file demarcated as a ringtone may include two or more non-contiguous portions of the media file.

Figure 6:
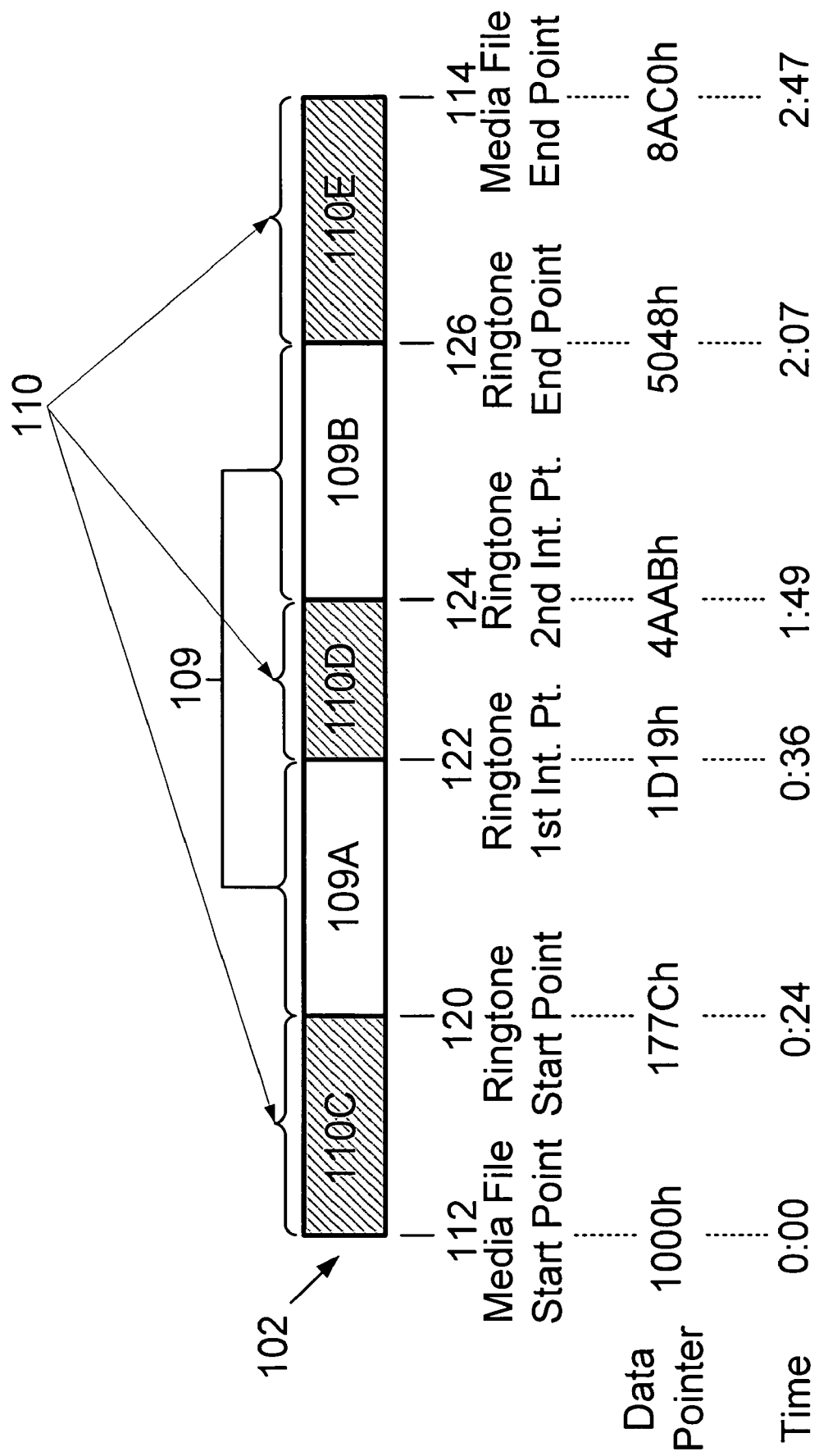

FIG. 6 is a diagram depicting media file 102 including a ringtone portion 109 and non-ringtone portion 110. Ringtone portion 109 includes two non-contiguous sub-portions 109A and 109B. Alternatively, ringtone portion 109 may include more than two non-contiguous sub-portions. Non-ringtone portion 110 includes three non-contiguous sub-portions 110C, 110D, and 110E. Alternatively, non-ringtone portion 110 may include a number of non-contiguous sub-portions greater than or less than three.

As shown in FIG. 6, boundaries of non-contiguous sub-portion 109A are defined by ringtone start point 120 and ringtone first intermediate point 122, and boundaries of non-contiguous sub-portion 109B are defined by ringtone second intermediate point 124 and ringtone end point 126. Each of the points 120, 122, 124, and 126 may be defined by processor 402 detecting a key being pressed on a keypad of user interface 406 while media file 102 is being played out at device 400. In this regard, a user may press the key four times to define points 120, 122, 124, and 126, that is, one key press for each of the points 120, 122, 124, and 126. Other examples of how points 120, 122, 124, and 126 are defined are also possible.

Ringtone start point 120 may be associated with a time value of 24 seconds (i.e., 0:24), ringtone first intermediate point 122 may be associated with a time value of 36 seconds (i.e., 0:36), ringtone second intermediate point 124 may be associated with a time value of 1 minute and 49 seconds (i.e., 1:49), and ringtone end point 126 may be associated with a time value of 2 minutes and 7 seconds (i.e., 2:07). Alternatively, or in combination, ringtone start point 120 may be associated with a data pointer of 177Ch, ringtone first intermediate point 122 may be associated with a data pointer of 1D19h, ringtone second intermediate point 124 may be associated with a data pointer of 4AABh, and ringtone end point 126 may be associated with a data pointer of 5048h. Each of these data pointers may be determined by processor 402 in response to detecting four key presses at user interface 406 (i.e., a key press for each data pointer).

Processor 402 may execute program instructions that cause user interface 406 to play out ringtone portion 109 of media file 102. By way of example, the program instructions for playing out ringtone portion 109 may cause processor 402 to retrieve from data storage 404 data of media file 102 stored at addresses 177Ch to 1D19h and 4AABh to 5048h, convert the retrieved data of media file 102 from a digital form to an analog form, and provide the converted data of media file 102 in analog form to user interface 406. User interface 406 may play out ringtone portion 109 as user interface 406 receives a portion of the converted data or after user interface 406 receives all of the converted data of media file 102. Alternatively, the program instructions may cause processor 402 to send the retrieved data of media file 102 directly to user interface 406 in digital form without converting the data to an analog form. In accordance with this alternative, user interface 406 may play out ringtone portion 109 as user interface 406 receives a portion of the digital data or after user interface 406 receives all of the digital data.

Playing out the portion of media file 102 demarcated as ringtone portion 109 may include playing out sub-portions 109A and 109B by playing out media file 102 from ringtone start point 120 to ringtone first intermediate point 122 and then from ringtone second intermediate point 124 to ring tone end point 126 one time. Alternatively, play out of ringtone portion 109 may include playing out sub-portions 109A and 109B more than one time. In this regard, while playing out ringtone portion 109 more than one time, each time ringtone end point 126 is reached, play out of ringtone portion 109 continues at ringtone start point 120.

Further and alternatively, playout of ringtone portion 109 may include playing out sub-portion 109A for a first length of time (e.g., 12 seconds) from ringtone start point 120 and then playing out sub-portion 109B for a second length of time (e.g., 18 seconds) from ringtone second intermediate point 124. In accordance with this alternative, the first length of time and the second length of time may be defined instead of or in addition to the ringtone first intermediate point 122 and ringtone end point 126. The first length of time may correspond to a length of time between the time value of 0:24 (corresponding to ringtone start point 120) and the time value of 0:36 (corresponding to ringtone first intermediate point). Similarly, the second length of time may correspond to a length of time between the time value of 1:49 (corresponding to the ringtone second intermediate point 124) and the time value of 2:07 (corresponding to the ringtone end point 126).

Although ringtones 108 and 109 are described as different portions of media file 102, ringtones 108 and 109 may be portions of separate media files. For example, ringtone portion 108 may be a portion of media file 102 and ringtone portion 109 may be a portion of another media file other than media file 102. This other media file may be any type of media file, such as any of the types of media files described herein.

As shown in FIGS. 5 and 6, a single media file 102 may be demarcated in two instances so as to demarcate ringtone portions 108, 109. In this way, two ringtone portions 108, 109 may be played out from a single media file. Alternatively, demarcating more than two ringtone portions of a single media file may be carried out such that more than two ringtone portions may be played out from a single media file.

Each ringtone portion of a single media file having multiple ringtone portions demarcated may correspond to a given alert event occurring at device 100. In this way, the ringtone portion corresponding to the given alert event is played out when the given alert event occurs. For example, ringtone portion 108 may play out as an alert in response to a first type of communication (e.g., an incoming phone call message) arriving at device 100 and ringtone portion 109 may play out as another alert in response to a second type of communication (e.g., an e-mail message) arriving at device 100. In this way, a user of device 100 may determine whether the communication arriving at device 100 is a communication of the first type or a communication of the second type by the ringtone portion that plays out when the communication arrives.

3. Exemplary Operation

Figure 7:
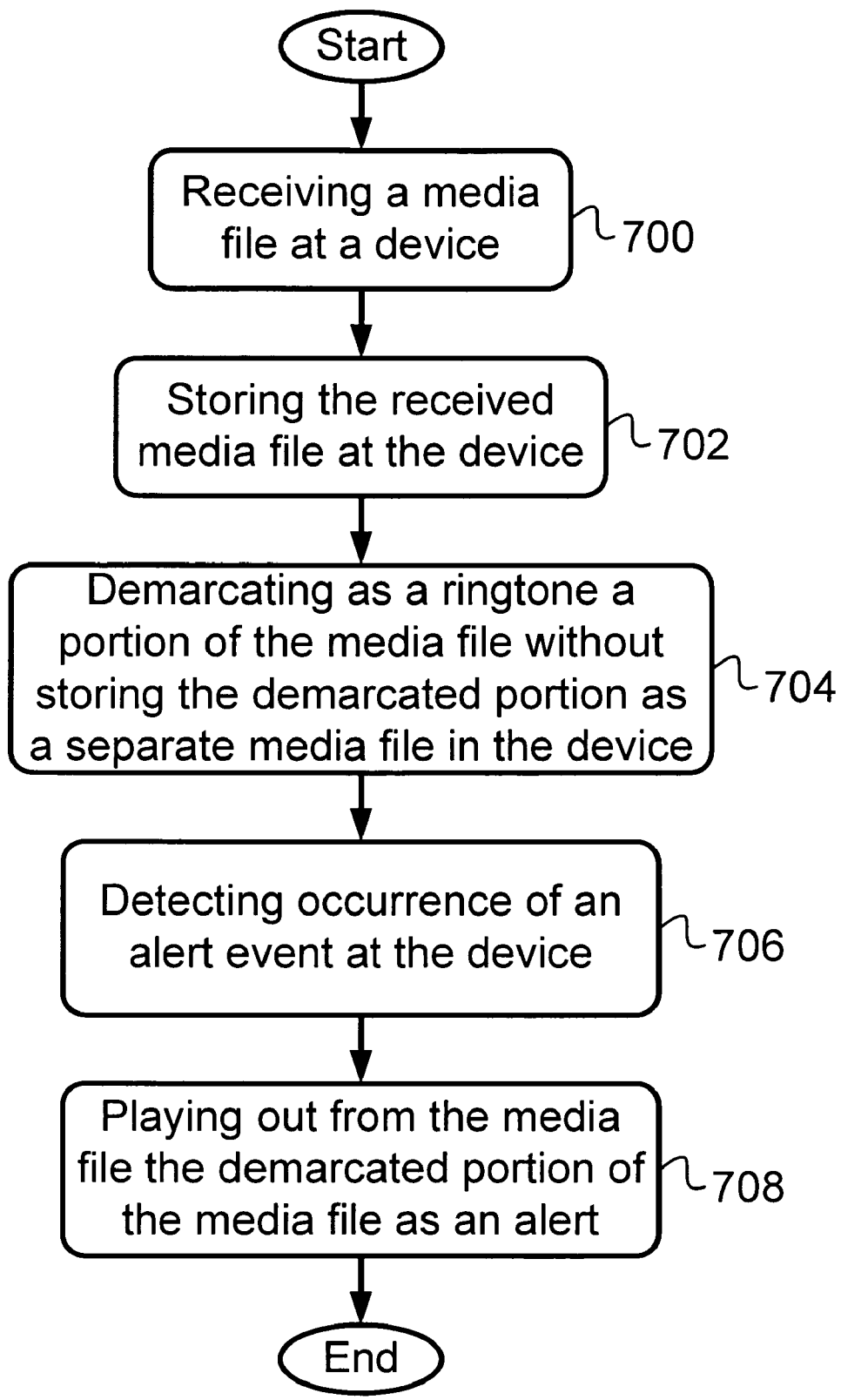
FIG. 7 is a flow chart depicting a set of functions that can be carried out in accordance with exemplary embodiments of the present invention.

FIG. 7 is a flow chart provided to illustrate some functions that may be carried out in accordance with exemplary embodiments of the present invention. The functions shown in FIG. 7 may be carried out in an order as shown in the figure (i.e., from top to bottom) or in another order, and one or more of the functions may be omitted. Furthermore, two or more of the functions shown in FIG. 7 may be carried out sequentially and/or two or more of the functions may be carried out at substantially the same time.

As shown in FIG. 7, block 700 includes receiving a media file (e.g., media file 102) at a device (e.g., device 400). Device 400 may receive media file 102 in any of a variety of ways. In one respect, device 400 may receive media file 102 via network interface 408. This may be carried out, for example, by: (i) network server 310 providing device 400 with a list of selectable media files that lists media file 102, (ii) user interface 406 receiving a user selection requesting transmission of media file 102 to device 400, (iii) network interface 408 transmitting to network server 310 a message containing a request for network server 310 to transmit media file 102 to device 400, and (iv) network interface 408 receiving media file 102 transmitted from network server 310 in response to the message. Other examples of device 400 receiving media file 102 via network interface 408 are also possible.

In another respect, device 400 may receive media file 102 via user interface 406. For example, a microphone and electronic circuitry of user interface 406 may detect sound waves and convert the detected sound waves into digital data and then provide the digital data to processor 402 and/or data storage 404 for storage as an audio file or as part of an audio-video file. As another example, a digital camera of user interface 406 may capture a series of images and then provide the series of images to processor 402 and/or data storage 404 for storage as a video file or as part of an audio-video file. Other examples of device 400 receiving media file 102 via user interface 406 are also possible.

In yet another respect, device 400 may receive media file 102 when device 400 is manufactured. For instance, media file 102 may be downloaded into data storage 404, as a default media file, when device 400 is manufactured. In this way, device 400 has at least one media file (i.e., the default media file) from which a user may demarcate a portion of the default media file as a ringtone portion without saving that ringtone portion as a separate media file. Other examples of how device 400 receives media file 102 are also possible.

Next, block 702 includes storing the received media file (e.g., media file 102) at the device (e.g., device 400). Processor 402 may execute program instructions that cause media file 102 to be stored at data storage 404. In addition to storing media file 102, data storage 404 may store data for use in retrieving media file 102 from data storage 404. For instance, data storage 404 may store the data pointer 1000h associated with the media file start point 112 and/or the data pointer 8AC0h associated with the media file end point 114. As another example, data storage 404 may store the time value 2:47 associated with the media file end point 114 as a means to determine the end of media file 102.

Next, block 704 includes demarcating as a ringtone a portion of the media file (e.g. media file 102) without storing the demarcated portion as a separate media file in the device (e.g. device 400). Demarcating a ringtone portion of media file 102 may be carried out in various ways. In one respect, demarcating a ringtone portion of media file 102 without storing the demarcated portion as a separate media file in device 400 may include demarcating as a ringtone (i) a contiguous portion of media file 102, such as ringtone portion 108, or (ii) a non-contiguous portion of media file 102, such as ringtone portion 109. In another respect, demarcating a ringtone portion of media file 102 without storing the demarcated portion as a separate media file in device 400 may be carried out at (i) device 400, or (ii) a device remote from device 400, in which case, the remote device may thereafter provide media file 102 to device 400 for storage of the ringtone portion of media file 102 without storing the ringtone portion as a separate media file in device 400.

As indicated above, demarcating as a ringtone a portion of media file 102 without storing the ringtone portion as a separate media file may be carried out at device 400. In this regard, processor 402 may execute program instructions that cause user interface 406 to (i) play out media file 102 to a user, and (ii) detect inputs entered via user interface 406, while media file 102 is being played out, so as to demarcate as a ringtone a portion of media file 102.

For example, while media file 102 is being played out, processor 402 may detect a first input entered via user interface 406 to define a ring tone start point (e.g., start point 116) and a second input entered via user interface 406 to define a ring tone end point (e.g., end point 118). The first and second inputs may be produced by user interface 406 in response to keys of a keypad of user interface 406 being pressed. In response to detecting the first input, processor 402 may determine a time value (e.g., 0:43) and/or a data pointer (e.g., 1FFFh) indicative of a first point of media file 102 playing at user interface 406 when processor 402 detects the first input. Similarly, in response to detecting the second input, processor 402 may determine a time value (e.g., 0:57) and/or a data pointer (e.g., 2A09h) indicative of a second point of media file 102 playing at user interface 406 when processor 402 detects the second input. Processor 402 may cause data storage 404 to store these determined time values and/or data pointers for subsequent playout of the portion of media file 102 demarcated as ringtone portion 108 without storing ringtone portion 108 as a separate media file at device 400.

As another example, while media file 102 is being played out, processor 402 may detect a third input entered via user interface 406 to define a ringtone start point (e.g., start point 120), a fourth input entered via user interface 406 to define a ringtone first intermediate point (e.g., intermediate point 122), a fifth input entered via user interface 406 to define a ringtone second intermediate point (e.g., intermediate point 124), and a sixth input entered via user interface 406 to define a ringtone end point (e.g., end point 126). The third, fourth, fifth, and sixth inputs may be produced by user interface 406 in response to key presses on a keypad of user interface 406.

In response to detecting the third input, processor 402 may determine a time value (e.g., 0:24) and/or a data pointer (e.g., 177Ch) indicative of a third point of media file 102 playing at user interface 406 when processor 402 detects the third input. In response to detecting the fourth input, processor 402 may determine a time value (e.g., 0:36) and/or data pointer (e.g., 1D19h) indicative of a fourth point of media file 102 playing at user interface 406 when processor 402 detects the fourth input. In response to detecting the fifth input, processor 402 may determine a time value (e.g., 1:49) and/or data pointer (e.g., 4AABh) indicative of a fifth point of media file 102 playing at user interface 406 when processor 402 detects the fifth input. In response to detecting the sixth input, processor 402 may determine a time value (e.g., 2:07) and/or data pointer (e.g., 5048h) indicative of a sixth point of media file 102 playing at user interface 406 when processor 402 detects the sixth input. Processor 402 may cause data storage 404 to store these determined time values and/or data pointers for subsequent playout of the portion of media file 102 demarcated as ringtone portion 109 without storing ringtone portion 109 as a separate media file at device 400.

Further, as indicated above, demarcating a portion of a media file as a ringtone may be carried out at a device remote from device 400. For example, network server 310 may demarcate a portion of media file 102 as ringtone portion 108 before network server 310 provides media file 102 to device 400 at block 700. Network server 310 may produce a start point indicator indicative of ringtone start point 116 and an end point indicator indicative of ringtone end point 118.

In one respect, network server 310 may alter media file 102 to store the start point indicator and the end point indicator as meta data of media file 102. Thereafter, network server 310 may transmit to device 400 media file 102 including the meta data that includes the start point indicator and the end point indicator.

In another respect, network server 310 may store a data file that indicates the start point indicator and end point indicator without altering media file 102. Thereafter, network server 310 may transmit to device 400 media file 102 and the data file that indicates the start point indicator and the end point indicator. After receiving media file 102 and the data file, device 400 may play out media file 102, identify the start point indicator and the end point indicator from the data file while media file 102 is playing out so as to identify the ringtone start point 116 and the ringtone end point 118, and store with media file 102 meta data that identifies the ringtone start point 116 and the ringtone end point 118 so as to store a ringtone portion of media file 102 without storing the ringtone portion as a separate media file.

As another example, demarcating a portion of media file 102 as a ringtone (e.g., ringtone portion 108) may be carried out at network entity 312. Network entity 312 may be a personal computer connected to IP network 308. A user of network entity 312 may select ringtone start point 116 and ringtone end point 118 while playing out media file 102 at network entity 312. Network entity 312 may associate the time value 0:43 with ringtone start point 116 and associate the time value 0:57 with ringtone end point 118 and save these time values as a start point indicator and an end point indicator, respectively. Network entity 312 may alter media file 102 to store (e.g., at data storage 326) the start point indicator and the end point indicator as meta data of media file 102, or store the start point indicator and end point indicator without altering media file 102.

After demarcating the ringtone portion of media file 102, network entity 312 may send media file 102, the start point indicator, and the end point indicator to (i) device 400, or (ii) network server 310 for transmission, in turn, to device 400. After receiving media file 102, the start point indicator, and the end point indicator, device 400 may store media file 102, the start point indicator, and the end point indicator so as to store the demarcated portion of media file 102 without storing the demarcated portion as a separate media file. Device 400 may store the start point indicator as ringtone start point 116 and the end point indicator as ringtone end point 118.

In accordance with the examples in which device 400 receives a media file, a start point indicator, and an end point indicator, device 400 may receive the start point indicator and the end point indicator at substantially the same time device 400 receives the media file 102.

As yet another example, demarcating a portion of media file 102 as a ringtone may include a user selecting ringtone start point 116 and a given length of time for the ringtone. For instance, for ringtone portion 108, the given length of time may be 14 seconds (i.e., the portion of media file between 0:43 and 0:57, as shown in FIG. 5. A user may select the given length of time for the ringtone by pressing a key on user interface 406 while media file 102 is playing out. Other examples of demarcating a portion of media file 102 as a ringtone are also possible.

Next, block 706 includes detecting occurrence of an alert event at the device (e.g., device 400). For instance, device 400 may detect occurrence of a communication arriving at device 400 as an alert event. The communication arriving at device 400 may be a communication that warrants playing out an alert at device 400 so as to alert a user of device 400 that the communication has arrived. As an example, communications that warrant playing an alert may be (i) an incoming phone call message, (ii) an e-mail message, (iii) an instant message (IM), (iv) a voice mail message, (v) a short message service (SMS) message, (vi) a multimedia message service (MMS) message, (vii) a page message, or (viii) a WLAN beacon signal. The WLAN beacon signal may indicate the presence of a WLAN. Other examples of the arriving communication are also possible.

Detecting arrival of the communication may occur at network interface 408. Alternatively, or in combination, network interface 408 may receive the arriving communication and processor 402 may execute program instructions that cause processor 402 to detect arrival of the communication. After detection of the arriving communication, processor 402 may execute program instructions for detecting a given type of the arriving communication and detecting whether the given type of the arriving communication warrants playing the demarcated portion of media file 102 (e.g., ringtone portion 108 or 109) as an alert.

As another example, the alert event detected at device 400 may be an alert event that does not depend on a communication arriving at device 400, although such as an alert event may result from a communication occurring within device 400. For instance, the alert event may be expiration of a timer, occurrence of a given time set as an alarm time, a meeting reminder, or device 400 powering on (i.e., changing from an off-state to an on-state) or powering off (i.e., changing from the on-state to the off-state). Other examples of an alert event that does not depend on a communication arriving at device 400 are also possible.

Next, block 708 includes playing out from the media file the demarcated portion of the media file as an alert. The demarcated portion of media file 102 may be played out at user interface 406 and may be played out in response to detecting occurrence of the alert event (in block 706). As an example, if media file 102 is an audio file, then the demarcated portion of media file 102 may be played out as an audio ringtone via one or more loudspeakers of user interface 406. As another example, if media file 102 is a video file, then the demarcated portion of media file 102 may be played out as a video ringtone via a display of user interface 406. As yet another example, if media file 102 is an audio-video file, then the demarcated portion of media file 102 may be played out as an audio-video ringtone via one or more loudspeakers and a display of user interface 406.

Playing out ringtone portion 108 of media file 102 may include playing out ringtone portion 108 from ringtone start point 116 to ringtone end point 118 one time. Alternatively, playing out ringtone portion 108 of media file 102 may include playing out ringtone portion 108 from ringtone start point 116 to ringtone end point 118 more than one time (e.g., two times). In this regard, while playing out ringtone portion 108 more than one time, each time ringtone end point 118 is reached, playout of ringtone portion 108 continues at ringtone start point 116.

Playing out the ringtone portion 109 of media file 102 may include playing out sub-portions 109A and 109B by playing out media file 102 from ringtone start point 120 to ringtone first intermediate point 122 and then from ringtone second intermediate point 124 to ring tone end point 126 one time. Alternatively, playout of ringtone portion 109 may include playing out sub-portions 109A and 109B more than one time.

In this regard, while playing out ringtone portion 109 more than one time, each time ringtone end point 126 is reached, playout of ringtone portion 109 continues at ringtone start point 120.

Further still, device 400 may perform other functions in addition to the functions shown in FIG. 7. For instance, processor 402 may execute program instructions to detect user input received at user interface 406, wherein the user input is a request to play out the entire media file 102 as a non-alert. As another example, processor 402 may execute program instructions to terminate playout of a ringtone portion (e.g., ringtone portion 108 or 109) in response to detecting user interface 406 has received a given user input (e.g., a user input to answer an incoming call when the arriving communication that triggers playout of the ringtone portion is an incoming call message).

4. Conclusion

Exemplary embodiments of the present invention have been described above. Those skilled in the art will understand, however, that changes and modifications may be made to the embodiments described without departing from the true scope and spirit of the present invention, which is defined by the claims.

We claim:

1. A method comprising:
    storing a media file and computer-readable program instructions within data storage at a cellular phone, wherein the computer-readable program instructions comprise program instructions that are executable by a processor of the cellular phone to demarcate a portion of the media file as a ringtone portion without storing the ringtone portion as a separate media file;
    while the media file is playing out via the cellular phone, the processor of the cellular phone executing the program instructions to demarcate a portion of the media file as a ringtone portion without storing the ringtone portion as a separate media file;
    the processor of the cellular phone detecting occurrence of an alert event; and
    the cellular phone playing the ringtone portion of the media file as an alert in response to the processor detecting occurrence of the alert event.

2. The method of claim 1,
    wherein the alert event is a communication arriving at the cellular phone.

3. The method of claim 2, wherein the communication arriving at the cellular phone is selected from the group consisting of: (i) an incoming phone call message, (ii) an e-mail message, (iii) an instant message, (iv) a short message service (SMS) message, (v) a multimedia message service (MMS) message, and (vi) a paging message.

4. The method of claim 2, further comprising:
    prior to storing the media file, the cellular phone requesting the media file from a network entity and thereafter receiving the media file from the network entity.

5. The method of claim 1,
    wherein the media file is an audio file.

6. The method of claim 1,
    wherein the media file is an audio-video file.

7. The method of claim 1, wherein the ringtone portion is a ringtone selected from the group consisting of: (i) an audio ringtone, (ii) a video ringtone, and (iii) an audio-video ringtone.

8. The method of claim 1, wherein executing the program instructions to demarcate the portion of the media file includes defining a ringtone start point and a ringtone end point.

9. The method of claim 8, wherein playing out the ringtone portion of the media file as an alert includes playing out the ringtone portion of the media file from the ringtone start point to the ringtone end point at least twice.

10. The method of claim 1, further comprising:
playing out the entire media file as a non-alert, responsive to a user request to play the media file.

11. The method of claim 1, wherein playing out the ringtone portion of the media file as an alert includes playing out the ringtone portion of the media file for a predetermined length of time associated with the alert event.

12. A device comprising:
a network interface that is operable to communicate with a base transceiver station via a cellular air interface of a radio access network;
a processor connected to the network interface;
data storage that contains (i) a media file, and (ii) computer-readable program instructions that are executable by the processor connected to the network interface; and
a user interface that is operable to play out the media file;
wherein the computer-readable program instructions include program instructions that are executable by the processor, while the user interface plays out the media file, to demarcate a portion of the media file as a ringtone portion without storing the ringtone portion as a separate media file, and
wherein the computer-readable program instructions include program instructions that are executable by the processor to cause the user interface to play out the ringtone portion of the media file as an alert in response to detection of an alert event at the device.

13. The device of claim 12,
wherein the user interface is operable to receive user input that causes the processor to execute the program instructions to demarcate a portion of the media file as a ringtone portion without storing the ringtone portion as a separate media file,
wherein the user input defines a ringtone start point and a ringtone end point, and
wherein playing out the ringtone portion of the media file includes playing out the ringtone portion of the media file from the ringtone start point to the ringtone end point.

14. The device of claim 13, wherein playing out the ringtone portion of the media file includes playing out the ringtone portion of the media file from the ringtone start point to the ringtone end point at least twice.

15. The device of claim 12,
wherein the user interface is operable to receive user input that causes the processor to execute the program instructions to demarcate a portion of the media file as a ringtone portion without storing the ringtone portion as a separate media file,
wherein the user input defines a ringtone start point and a ringtone first intermediate point both defining a first sub-portion of the ringtone portion, and a ringtone second intermediate point and a ringtone end point both defining a second sub-portion of the ringtone portion, and
wherein playing out the ringtone portion of the media file includes playing out the first sub-portion of the ringtone portion from the ringtone start point to the ringtone first intermediate point and then playing out the second sub-portion of the ringtone portion from the ringtone second intermediate point to the ringtone end point.

16. The device of claim 12,
wherein the media file is an audio file, and
wherein the user interface comprises a speaker for playing out the ringtone portion of the media file.

17. The device of claim 12,
wherein the media file is an audio-video file, and
wherein the user interface comprises a speaker and a display for playing out the ringtone portion of the media file.

18. The device of claim 12,
wherein the media file is a video file, and
wherein the user interface comprises a display for playing out the ringtone demarcated portion of the media file.

19. The device of claim 12,
wherein the network interface is operable to receive a communication arriving at the device,
wherein the alert event is the communication arriving at the device, and
wherein the communication is selected from the group consisting of (i) an incoming phone call message, (ii) an e-mail message, (iii) an instant message, and (iv) a voice mail message.

20. The device of claim 12,
wherein the network interface is operable to receive a communication arriving at the device,
wherein the alert event is the communication arriving at the device, and
wherein the network interface comprises an interface selected from the group consisting of: (i) a cellular wireless network interface, and (ii) a wireless local area network (WLAN) interface.

21. The device of claim 20, wherein the communication is selected from the group consisting of: (i) an incoming phone call message, (ii) an e-mail message, (iii) an instant message, (iv) a voice mail message, (v) a short message service (SMS) message, (vi) a multimedia message service (MMS) message, (vii) a paging message, and (viii) a WLAN beacon signal.

22. The device of claim 12, further comprising:
program instructions that cause the processor to play out the entire media file as a non-alert, responsive to the user interface receiving a user request to play the media file.

23. The device of claim 12, wherein the program instructions include instructions to detect the alert event at the device.

* * * * *